United States Patent
Mizuno et al.

[11] Patent Number: 6,151,914
[45] Date of Patent: Nov. 28, 2000

[54] METHOD AND APPARATUS FOR PRODUCING SUPER CLEAN AIR

[75] Inventors: Masashi Mizuno; Masuo Tada; Norio Yamazaki, all of Osaka; Toshiaki Ohmori, Tokyo, all of Japan

[73] Assignees: Taiyo Toyo Sanso Co., Ltd., Osaka; Mitsubishi Denki Kabushiki Kaisha, Tokyo, both of Japan

[21] Appl. No.: 09/152,688

[22] Filed: Sep. 14, 1998

[30] Foreign Application Priority Data

Sep. 17, 1997 [JP] Japan .................................... 9-251567
Nov. 5, 1997 [JP] Japan .................................... 9-302606

[51] Int. Cl.$^7$ ...................................................... F25J 1/00
[52] U.S. Cl. .............................................. 62/648; 62/909
[58] Field of Search ............................ 62/648, 908, 909

[56] References Cited

U.S. PATENT DOCUMENTS

| | | | |
|---|---|---|---|
| 2,915,880 | 12/1959 | Schuftan et al. | 62/908 |
| 3,192,729 | 7/1965 | Becker | 62/909 |
| 3,421,333 | 1/1969 | Plotz et al. | 62/908 |
| 3,718,005 | 2/1973 | McDermott | 62/909 |
| 4,367,082 | 1/1983 | Tomisaka et al. | 62/909 |
| 5,689,974 | 11/1997 | Fujita et al. | 62/644 |

*Primary Examiner*—Ronald Capossela
*Attorney, Agent, or Firm*—Griffin & Szipl, P.C.

[57] ABSTRACT

Super clean air suitable for use in a tunnel-type wafer transport system, etc., is produced efficiently with the specific energy consumption reduced and the yield improved by making good use of part of cooling energy and gas produced in a low temperature separation type nitrogen producing apparatus. Material air $1a$ collected from the atmosphere is pretreated in a room temperature adsorption tower 7, this pretreated air is adsorption treated at −60° C. in a first low temperature adsorption tower 9, and the treated air $1c$ is further adsorption treated at −150° C. in a second low temperature adsorption tower 10, thereby producing super clean air $1e$ containing not higher than 1 ppb of the chemical components other than nitrogen, oxygen and noble gases and having a dew point of not higher than −100° C. The airs $1b$ and $1c$ are cooled in heat exchangers 12, 13 and 14 by utilizing cooling energy produced in the low temperature separation type nitrogen producing apparatus, that is, the low temperature gas $3f$ passed through an expansion turbine 38 from a rectifying tower 37.

20 Claims, 8 Drawing Sheets

METHOD AND APPARATUS FOR PRODUCING SUPER CLEAN AIR

TECHNICAL FIELD

The present invention relates to a method and apparatus for producing super clean air with atmospheric air as material. More specifically, this invention relates to eliminating from the material atmospheric air its chemical components other than nitrogen, oxygen and noble gases utilizing a deep freeze separation type nitrogen production apparatus installed at semiconductor manufacturing and other plants. The chemical components to be eliminated include hydrocarbons, organic halogens, acidic gases, basic gases, aldehydes and nitrogen oxides. The super clean air may be used in the manufacture of semiconductors and in industrial and medical fields where prevention of contamination by chemical components in the atmosphere is essential.

BACKGROUND ART

To prevent contamination of wafers and generation of natural oxide films, the process of producing semiconductors is generally carried out in a clean room at semiconductor manufacturing plants. Before the air is led into the clean room, some of the chemical components in the air are removed by an activated carbon filter, as necessary depending on the quality of the ambient air. The air is also regulated to be at a constant temperature of 23° C. to 25° C. and a relative humidity (RH) of 40 to 50 percent by an air-conditioning system.

With the advances in the integration of semiconductors, however, it is now clear that the air in the clean room supplied by the air-conditioning system as mentioned is no longer clean enough for the semiconductor manufacturing plants; the chemical components and moisture in the clean room air constitute a new source of contamination for wafers.

In addition to nitrogen, oxygen and noble gases (Ar, Ne, Kr etc. belonging to group O of the periodic table), the air contains diverse chemical components such as hydrocarbons, organic halogens, acidic gases, basic gases, aldehydes, nitrogen oxides, etc., and these diverse chemical components may contaminate semiconductor wafers independently or in the presence of moisture, even if their concentration is extremely low.

The degree of humidity secured as described above is provided to alleviate dryness in the mouths of workers, etc., but when air having this degree of humidity is present, a natural oxide film easily forms on wafers in contact with such air. For example, when the dew point is around –90° C. (moisture content 0.1 ppm), natural oxide film is scarcely formed even after a lapse of some 100 hours, but when the dew point is around 10° C. (moisture content 1.2 vol %), a natural oxide film will form in a few minutes.

Therefore, in order to prevent this kind of wafer contamination and the generation of a natural oxide film, super clean air must be used as the air with which the wafer comes in contact. This super clean air must have chemical components and moisture content removed therefrom to the same degree as super high quality gases such as the nitrogen gas used in the semiconductor manufacturing process. Specifically, in order to prevent wafer contamination, the chemical components in the air must be removed such that the remaining chemical components do not exceed a part per billion (ppb) level, equivalent to the level of chemical components contained in super high quality gases. Also, in order to prevent the generation of a natural oxide film on the wafer, the dew point of the air must be lowered to –40° C. to –120° C. (preferably –100° C. or lower).

The requirement for super clean air causes the production costs to be extremely high as compared to clean room air conditioned and controlled by an air-conditioning system as described above. That makes it too costly and difficult to provide super clean air as the atmosphere in a large volume to fill an entire clean room. Meanwhile, the clean room where wafers come in contact with air has some sections which are originally designed to be of a small volume from the viewpoint of functions and application and also some areas whose volume can be greatly reduced within a range which does not hinder semiconductor production—the wafer transport region between the processes, for example.

Meanwhile, a tunnel type wafer transport system has been proposed which minimizes the volume of super clean air required and at the same time prevents as much as possible the contamination of wafers and the formation of natural oxide films during wafer transport. In this system, the wafer transport region is formed in a tunnel with the minimum required volume for transporting wafers, and super clean air is supplied to the tunnel rather than to the entire clean room. It has also been proposed to supply super clean air to places other than the tunnel (for example, the inner space of a storage apparatus), too, where contact of the wafer with air is likely to permit contamination or formation of a natural oxide film. To prevent wafer contamination, etc. it has also been proposed to supply nitrogen gas to the tunnel, etc., in place of super clean air, but the use of nitrogen is not practical from the viewpoint of cost and safety to humans.

As set forth above, it is possible to effectively prevent wafer contamination and the formation of natural oxide films by supplying super clean air to the wafer transport tunnel, etc. In consideration of costs and other factors, it is desirable that the super clean to be used for the purpose should be produced from atmospheric air.

However, the chemical components in the atmosphere are diverse as described above, and because the types of chemical components contained in material air differ widely depending on where the air is collected from the atmosphere, it is extremely difficult to remove all the chemical components in the material air to the degree that the remaining chemical components are so scarce as to stand at no more than about one ppb. Furthermore, no method has been proposed for producing super clean air efficiently and in large quantities by using atmosphere as the material from which the super clean air is derived. This has hindered the practical applications of the tunnel method to the wafer transport system, etc., described above. Super clear air is needed in not only the semiconductor manufacturing field but also other manufacturing and medical fields where contamination by chemical components in the atmospheric air has to be avoided. And there have been growing calls for development of an efficient method of producing super clear air from the free material atmospheric air.

In answer to such calls, the inventors conducted extensive research and experiments and finally succeeded in developing a method of producing super clean air. This method involves low temperature adsorption treatment of the material air with an adsorbent like synthetic zeolite at a low temperature of not higher than –60° C. In this treatment, the chemical components are reduced down to the one ppb or lower level and the dew point drops to a range from –40° C. to –100° C.

But the formation of a wafer transport path of a tunnel much smaller than the clean room in volume still needs a huge amount of super clean air. To produce such a huge amount of super clean air in the newly developed method, the specific consumption of energy needed to cool the material down to −60° C. or lower will inevitably rise. Because usual refrigerators can not bring the temperature down to −60° C. or lower, liquid nitrogen has to be used. The consumption of this liquid nitrogen is extremely high.

In the new method, it is preferable to adsorb and remove the moisture and carbon dioxide gas by adsorption treatment at room temperature beforehand in order to facilitate the subsequent low temperature adsorption treatment at a temperature of −60° C. or lower and raise the treatment efficiency. In the light of the running cost, it is desired to use, as regeneration treatment gas for the adsorbent, the clean air obtained in the process of producing super clean air by the new method.

The problem is, however, that the treatment requires a large quantity of regeneration treatment gas. If all this comes from the clean air produced in this production process, the yield of super clean air on the material air will naturally decrease substantially, resulting in increased electricity consumption.

Thus, it is essential to bring down the specific energy consumption and to improve the production yield. Unless these questions are solved, the new method is not practicable.

Meanwhile, deep freeze separation type nitrogen production apparatuses are installed at many semiconductor manufacturing plants where super clean air is needed because nitrogen gas is used in large quantities.

Those nitrogen producing apparatuses are generally so designed that the material air is given a pretreatment (in which moisture, carbon dioxide gas etc. are eliminated by adsorption treatment at room temperature), cooled down to the boiling point by a main heat exchanger, then liquefied and rectified at about −170° C. in a low temperature section or a rectifying tower. In that system, produced cooling energy and gas are made good use of. For example, the low temperature gas coming from the rectifying tower through an expander such as expansion turbine is led into the main heat exchanger for cooling the material air, and then utilized as regeneration gas for pretreatment absorbent.

But even such nitrogen producing apparatuses making effective use of cooling energy and gas still leave substantial quantities of cooling energy and gas unutilized. In producing 2,900 $Nm^3/h$ of nitrogen gas and 100 $Nm^3/h$ of liquid nitrogen out of 8,250 $Nm^3/h$ of the material air, for example, the low temperature gas (at −179° C. or so) that passes through the expansion turbine from the rectifying tower amounts to 5,250 $Nm^3/h$. The temperature required to bring the material air close to the boiling point by the main heat exchanger is about −170.5° C. The gas sensible heat from this temperature difference can be used which has cooling energy enough for cooling the air to not higher than −60° C. needed in the low temperature adsorption treatment by the newly developed method. It is also pointed out that 5,250 $Nm^3/h$ of the gas passes through the main heat exchanger, of which 1,250 $Nm^3/h$ is used as regeneration gas of the pretreatment adsorbent for the nitrogen producing apparatus. The remaining 4,000 $Nm^3/h$ can be used as regeneration gas for the adsorbent used in the room temperature treatment which is considered as desirable in the newly developed method.

The present invention is based on the discovery that deep freeze separation type nitrogen producing apparatuses are installed at many semiconductor producing plants and that the surplus cooling energy and gas therefrom can be utilized as cooling energy and gas needed in the low temperature adsorbent treatment.

SUMMARY OF THE INVENTION

It is an object of the present invention to provide a method of producing super clean air efficiently that is suitable for use in the tunnel-type wafer transport system or the like by using part of the cooling energy and gas produced from those nitrogen producing apparatuses to keep down the energy consumption and to raise the production yield. It is another object of the present invention to provide an apparatus for producing super clean air that can put the method to practical applications without difficulty.

The method of producing super clean air which can achieve those objects of the present invention relates to a method of producing super clean air which utilizes deep freeze separation type nitrogen producing apparatus. Specifically, in the super clean air producing method, the material air taken from the atmosphere is cooled down to −60° C. to −180° C. using the cooling energy produced in the nitrogen producing apparatus, followed by low temperature adsorption treatment at that low temperature to adsorb and remove from the material air the chemical components contained therein other than nitrogen, oxygen and noble gases. In this specification, "chemical components" mean all the elements contained in the material air including $H_2O$ but excluding nitrogen, oxygen and noble gases, the composition being different depending on the ambient air quality. For example, the material air sampled at such places as a semiconductor manufacturing plant is different, from that taken in a place polluted by exhaust gases from cars and industrial plants, in its composition and concentration of chemical components to be removed. The main components to be removed from the material air generally include hydrocarbons, organic halogens, acidic gases, basic gases, aldehydes and nitrogen oxides.

In this method, it is desirable to regenerate the adsorbents used in the production of super clean air (the adsorbents used in the pretreatment and low temperature adsorption treatment) using the gas produced in the nitrogen producing apparatus. It is also preferable to cool the material air down to −60° C. to −180° C. using the low temperature gas that flows to the main heat exchanger from the rectifying tower through the expander.

It is also desirable to subject the air material to a low temperature adsorption treatment so to produce super clean air with a concentration of the chemical components of not higher than 1 ppb and a dew point of not higher than −100° C. It is noted that the chemical component analyzer used in evaluating air produced by the present method had, to my knowledge, the highest accuracy of all the presently available analyzers. Since the detection limit of this analyzer was 1 ppb, it was impossible to accurately detect the chemical component concentration when it was less than 1 ppb. Consequently, "the chemical component concentration of 1 ppb or less" as used herein means, in short, that the concentration of the chemical component is below the detection limit of the analyzer.

In order to produce super clean air with higher quality, the chemical components are classified into a plurality of groups each including chemical components whose respective solidification temperatures are close to each other, and the low temperature adsorption treatment process is divided into adsorption steps the number of which is equal to the number of chemical component groups. The treatment temperature for each group is set at a temperature close to, but somewhat higher than, a solidification temperature range for each chemical component group such that the chemical components are adsorbed and removed group by group, starting with the group having the highest solidification temperature range and so forth.

Adsorbents which can selectively and preferentially adsorb nitrogen under temperature conditions from −40° C. to −180° C. are preferred for the low temperature adsorption treatment. Among them is synthetic zeolite.

In order to alleviate the load on the low temperature adsorption treatment and to improve the treatment efficiency, the material air is pretreated to remove at least carbon dioxide gas and moisture content among the chemical components before undertaking low temperature adsorption treatment. The material air is adsorption treated at room temperature, using, as the adsorbent, a mixture of activated alumina and synthetic zeolite. Optionally, the room temperature adsorption treatment may be carried out after the material air is subjected to an oxidation treatment by a noble metal catalyst, such as palladium-based catalyst, etc., under suitable heating conditions to remove CO, $H_2$, $CH_4$, etc., present in trace amounts in the air. That is, the treatment is carried at 130° C. to 150° C. to remove CO, $H_2$ and at 300° C. to 400° C. to remove lower hydrocarbons such as $CH_4$.

The super clean air producing apparatus according to the present invention to put the inventive method to practical applications is installed alongside a deep freeze separation type nitrogen producing apparatus. This super clean air producing apparatus comprises cooling means to cool the material air taken from the atmosphere down to −60° C. to −180° C. using the surplus cooling energy of the nitrogen producing apparatus and low temperature adsorption treatment means to subject the air to low temperature adsorption treatment by adsorbent at that low temperature thereby removing from the material the chemical components other than nitrogen, oxygen and noble gases.

This super clean air producing apparatus is preferably so constituted that the cooling means comprises a cooling source heat exchanger to cool the super clean air obtained by the low temperature adsorption treatment means in a heat exchange with the low temperature gas flowing from the rectifying tower through the expander to the main heat exchanger in the nitrogen producing apparatus and a heat exchanger to cool the material air to −60° C. to −180° C. in a heat exchange with the super clean air cooled by the cooling source heat exchanger. In addition to those cooling means and low temperature adsorption treatment means, it is desired that the super clean air producing apparatus has a pretreatment means to remove at least moisture and carbon dioxide gas from the material air, and furthermore to reduce the content of lower hydrocarbons including $CH_4$.

DESCRIPTION OF PREFERRED EMBODIMENTS

Now, embodiments of the present invention will be described hereinafter with reference to FIGS. 1 to 3.

Figure 1:
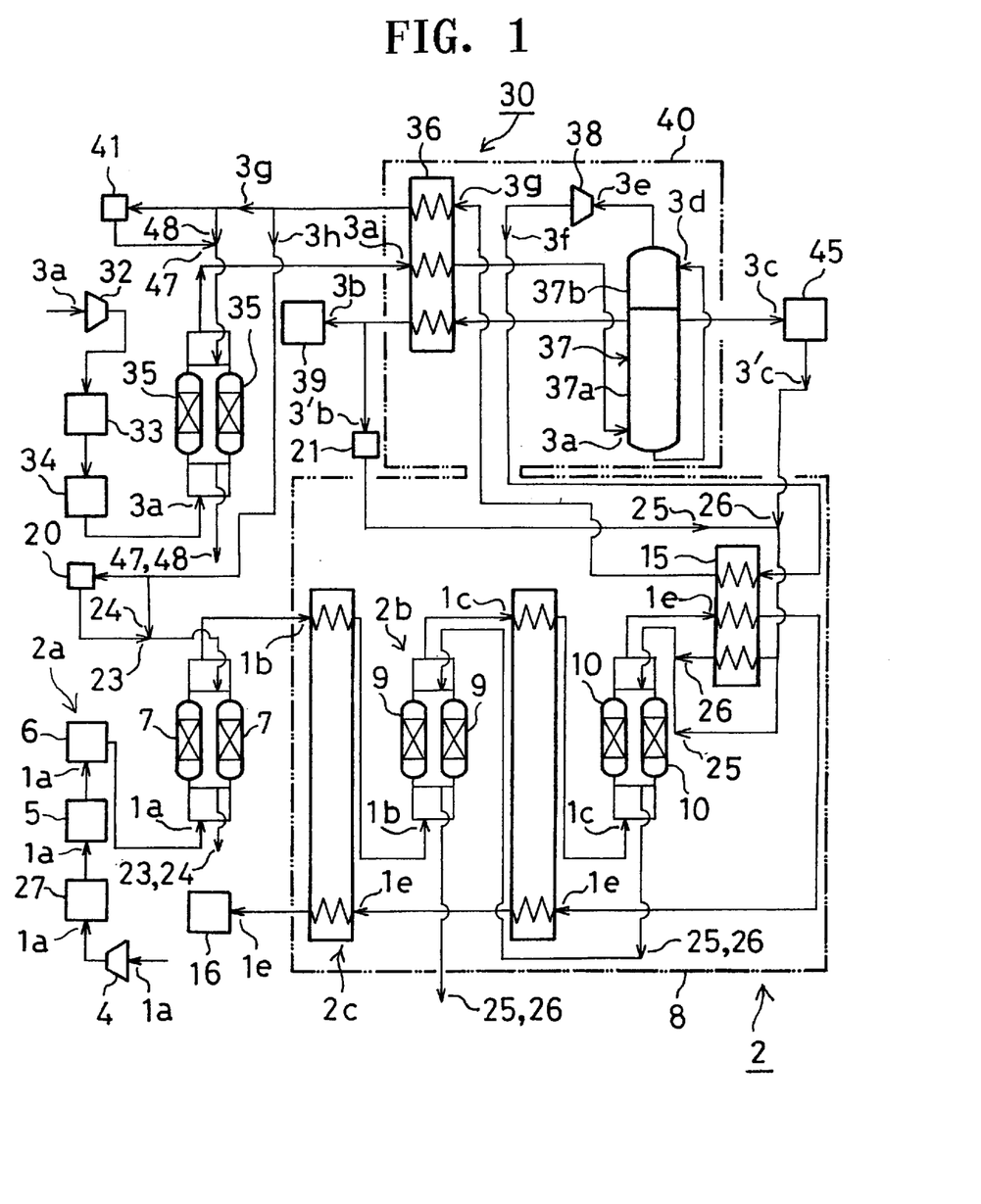
FIG. 1 is a system diagram showing an embodiment of the apparatus for producing super clean air according to the present invention.

The apparatus 2 for producing super clean air according to the present invention is combined with a deep freeze separation type nitrogen producing apparatus 30 and comprises a pretreatment means 2a, low temperature adsorption treatment means 2b and cooling means 2c as shown in FIG. 1.

A variety of nitrogen producing apparatuses are known. The apparatus shown in FIGS. 1 and 2 is one of them. The apparatus shown in FIGS. 1 and 2 is so arranged that the material air 3a taken from the atmosphere is led through a compressor 32, a cooler 33, a refrigerator 34, a room temperature adsorption tower 35 and a main heat exchanger 36 into a rectifying tower 37 where the air is rectified and separated into nitrogen and oxygen whereby nitrogen gas 3b, liquid nitrogen 3c etc. are obtained. Some deep freeze constituent parts of the nitrogen producing apparatus 30 are provided within a cold box 40. They include the main heat exchanger 36 and the rectifying tower 37 but exclude the compressor 32, cooler 33, refrigerator 34 and room temperature adsorption tower 35.

In the nitrogen producing apparatus 30, the material air 3a is first compressed up to a specific pressure, 7 kg/cm$^2$G, for example, by the compressor 32 and then cooled by the cooler 33 and refrigerator 34 to room temperature or about 5° C. to condense and separate the moisture. Then, the air proceeds to the room temperature adsorption tower 35 and comes in contact with an adsorbent 35a, a mixture of activated alumina and synthetic zeolite, for example, packed therein where the moisture and carbon dioxide gas are adsorbed and removed to some extent, $H_2O$ to 0.01 ppm or lower and $CO_2$ to 0.3 ppm or lower, for example. Meanwhile, the material air 3a that has passed through the room temperature tower 35 is cooled close to its boiling temperature in the main heat exchanger 36 and then led into the rectifying tower 37. The main heat exchanger 36 is of the internal cold type which cools the material air 3a in a heat exchange with low temperature gases 3b and 3g discharged from the rectifying tower 37 as will be described later. The room temperature adsorption tower 35 is paired with another identical tower 35, the two towers installed side by side. It is so arranged that while one room temperature adsorption tower 35 is in the process of adsorption, the other room temperature adsorption tower 35 receives a regeneration treatment gas 47 and cooling treatment gas 48 to undertake the steps of regenerating and cooling the adsorbent 35a. This adsorption process and the regeneration and cooling process are switched alternately between the two adsorption towers 35 and 35 in a specific cycle. The regeneration treatment gas 47 is heated to a specific temperature, 130° C., for example by the heater 41, and then is supplied to the adsorption tower 35 to heat and regenerate the adsorbent 35a in the adsorbent tower 35. After regeneration treatment, the cooling treatment gas 48 is led into the adsorbent tower 35 without being heated by the heater 41 to cool the same.

The rectifying tower 37 comprises a high pressure tower 37a of a lower tower operated at a suitable internal pressure equal to the pressure of the material air 3a led therein (in a range from 5 kg/cm$^2$G to 7 kg/cm$^2$G), a low pressure tower 37b of an upper tower operated at a suitable internal pressure lower than the lower tower pressure (in a range from 2 kg/cm$^2$G to 3 kg/cm$^2$G) and a main condenser (not shown) mounted between the two towers 37a and 37b. In this rectifying tower 37, the material air 37a is rectified and separated this way: After passing through the main heat exchanger 36, the material air 3a is led to the lower part of the high pressure tower 37a, and while going up in the high pressure tower 37a, the air material 3a comes in contact with the counter current of the circulation liquid supplied from the above and increases in nitrogen concentration, turns into nitrogen gas and is discharged as product gas 3b from the top of the high pressure tower 37a. The liquid on the upper rectifying shelf of the high pressure tower 37a is the rectified liquid nitrogen 3c. The liquid is drawn from the high pressure tower 37a and stored in the storage tank 45. At the bottom of the high pressure tower 37a, the liquid air with an increased oxygen concentration stays, which is decompressed and led into the lower pressure tower (condenser) 37b and vaporized. The vaporized gas 3e is discharged from the low pressure tower 37b and partially cooled in the main heat exchanger 36 (the path through the main heat exchanger not shown), and adjusted to a specific pressure by expansion turbine 38 and brought down to a low temperature. After passing through the expansion turbine 38, the low temperature gas 3f is led into the super clean air producing apparatus 2 before entering the main heat exchanger 36. After giving cooling energy there, the low temperature gas 3f comes back to the nitrogen producing apparatus 30 and as cooling medium gas 3g cools in the main heat exchanger 36 the material air 3a to be led into the rectifying tower 37. In this main heat exchanger 36, the material air 3a is also cooled in a heat exchange with the product nitrogen gas 3b which has been discharged from the rectifying tower 37, so that the product nitrogen gas 3b is brought to a room temperature and in supplied to specific application areas. The gas 3g which has passed through the main heat exchanger 36 is in part supplied as regeneration treatment gas 47 and cooling treatment gas 48 to the room temperature adsorption tower 35 where no adsorption process is under way. The quantity of gases 47 and 48 required for regeneration and cooling of the adsorbent 35 is relatively small as compared with that of the gas 3g that has passed through the main heat exchanger 36, producing a surplus gas.

Figure 3:
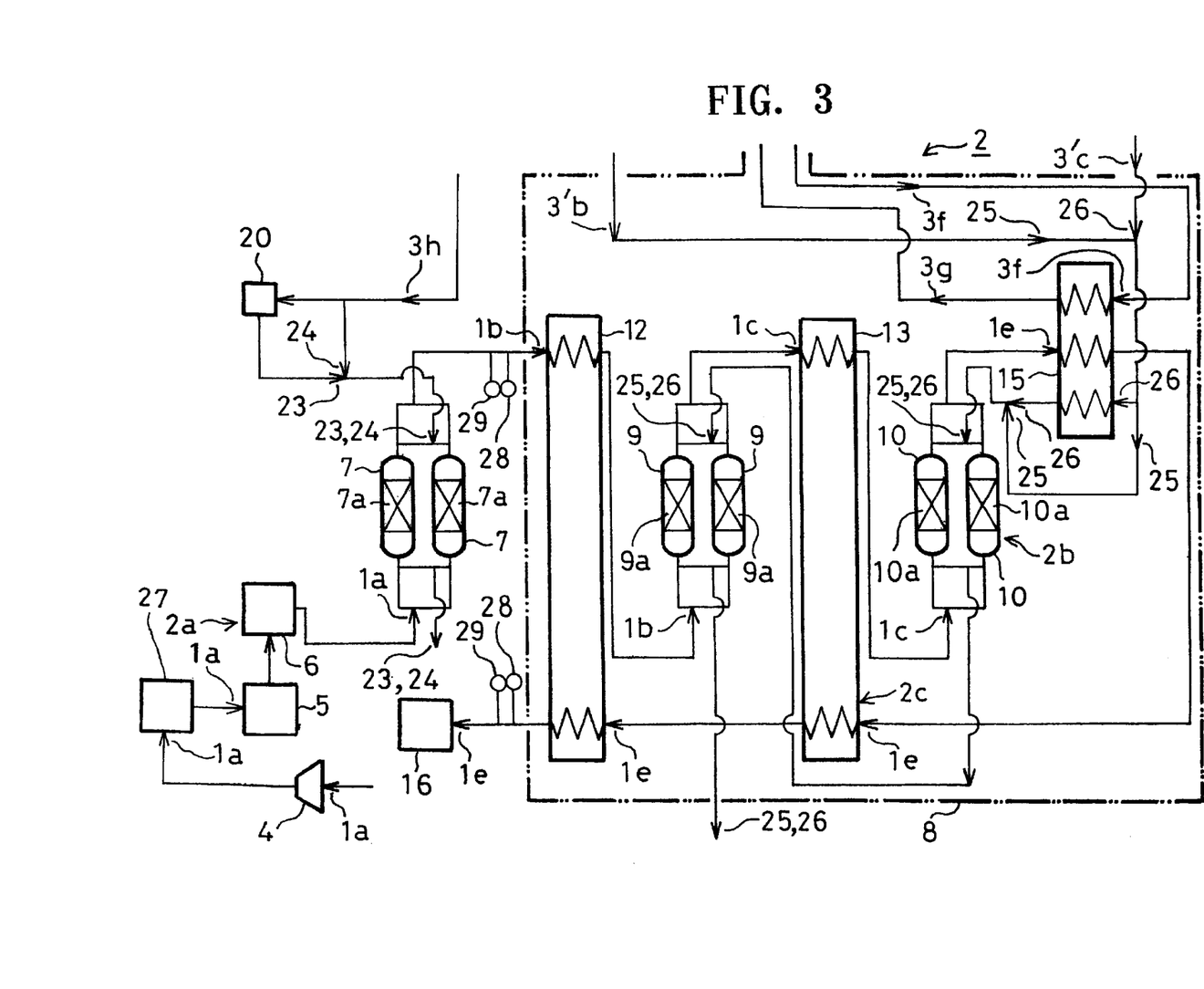
FIG. 3 is an enlarged diagram of the apparatus for producing super clean air forming another main part in FIG. 1.

The super clean air producing apparatus 2 is for producing super clean air 1e by subjecting the material air 1a taken from the atmosphere to a pretreatment by the pretreatment means 2a, followed by an adsorption treatment at a low temperature of −60° C. to −180° C. in the low temperature adsorption treatment means 2b and the cooling means 2c as shown FIGS. 1 and 3. The main purpose of the pretreatment is to remove the moisture and carbon dioxide gas contained in the material air 1a. The low temperature adsorption treatment reduces to the order of one ppb or ppt (to be concrete, down to the level equal to or less than the detection limit—one ppb—of the chemical components analyzer 28 which will be discussed later) the chemical components contained in the air 1a (such as hydrocarbons, organic halogens, acidic gases, basic gases, aldehydes and nitrogen oxides) except nitrogen, oxygen and noble gases (Ar, Ne, Kr etc. belonging to group O of the periodic table). Thus, super clean air 1e with a dew point of −40° C. or lower preferably not higher than −100° C.) is obtained.

The pretreatment means 2a is for pretreatment of the material air 1a to alleviate the burden on the low adsorption treatment which will be described later and to improve the treatment efficiency. In the pretreatment, the material air 1a collected from the atmosphere at 15° C. to 21° C. with a relative humidity (RH) of 60 to 80%, for example, is compressed by the compressor 4 and led into a catalyst tower 27 for oxidation treatment and further cooled down to the level of room temperature by suitable cooling means 5 and 6 to condensate and remove moisture. Then, the material air 1a is introduced into the room temperature adsorption tower 7 where the moisture and carbon dioxide gas are removed by adsorption as much as possible. As the compressor 4, an oil free reciprocating compressor or the like serves the purpose. The compressor 4 compresses the material air 1a up to the level from 0.5 kg/cm$^2$G to 9 kg/cm$^2$G, preferably 0.5 kg/cm$^2$G to 3 kg/cm$^2$G.

The catalyst tower 27 is packed with a palladium-based or other noble metal catalyst. Part of the chemical components in the material air 1a are removed after being oxidized in contact with the noble metal catalyst under suitable heating conditions. CO and $H_2$ are removed at 130° C. to 150° C. and lower hydrocarbons like $CH_4$ at 300° C. to 400° C. That is, the material air 1a introduced into the catalyst tower 27 is brought in contact with the noble metal catalyst under the aforesaid heating conditions, whereby the chemical components contained in trace amounts in the material air 1a such as CO, $H_2$ and $CH_4$ are largely oxidized into $H_2O$ and $CO_2$. The material air 1a thus subjected to oxidation treatment in the catalyst tower 27 is led into the room temperature adsorption tower 7 for room temperature adsorption treatment as will be described later. There, the material air 1a is effectively cleared of the chemical components as $H_2O$, $CO_2$, $H_2$, CO and $CH_4$. The cooling means may be an after cooler 5 and a refrigerator 6 (heat exchange-type cooler using an electric-type refrigerator as cooling source). The material air 1a coming out through the catalyst tower 27, is cooled down to about 30° C. in the after cooler 5 and further cooled to about 5° C. in the refrigerator 6, whereby the moisture is condensed and removed.

The room temperature adsorption tower 7 packed with a suitable adsorbent 7a is for adsorption treatment at room temperature, 25° C., for example. In this tower 7, primarily the moisture and carbon dioxide are adsorbed and removed to some level, $H_2O$ to 0.01 ppm or less and $CO_2$ to 0.3 ppm or less, for example. The suitable adsorbent 7a may be a mixture of activated alumina and synthetic zeolite. The quantity packed is decided on according to the amount of air to be treated. The main purpose of the room temperature adsorption tower 7 is to adsorb and remove $H_2O$ and $CO_2$ at room temperature around 25° C. But other chemical components, particularly high-boiling-point hydrocarbon systems, polar $NH_3$, NO, HCl, HF etc., are also removed in part though not to the extent required in super clean air, that is, 1 ppb or less.

The low temperature adsorption treatment means 2b and the cooling means 2c are provided within a cold box 8 built next to the cold box 40 of the nitrogen producing apparatus 30 as shown in FIGS. 1 and 3. In this means 2b, the pretreated air 1b or the material air pretreated in the pretreatment means 2a as described is put to an adsorption treatment under low temperature conditions at −60° C. to −180° C., thereby being cleared of the chemical components remaining in the pretreated air 1b that failed to be removed and still remain at more than the targeted level of 1 ppb or less. Those chemical components such as CO, $CO_2$, HC, $NH_3$, $Cl_2$, NOx, SOx, P compounds and B compounds are removed in this step, with the dew point brought down to −40° C. to −120° C., and preferably −100° C. or lower.

The low temperature adsorption treatment means 2b comprises a pair of first low temperature adsorption towers 9 and 9 and a pair of second low temperature adsorption towers 10 and 10. The cooling means 2c is made up of first and second heat exchangers 12 and 13, and there is provided a cooling source heat exchanger 15.

The respective low temperature adsorption towers 9 and 10 are packed with specific quantities of adsorbents 9a and 10a. Preferably used as those adsorbents 9a and 10a is synthetic zeolite (preferably, with fine pores about 5 Å in diameter). But other adsorbents can be used as long as they have an adsorption property of preferentially, selectively adsorbing nitrogen under low temperature conditions at −60° C. to −180° C., that is, the adsorption capacity is $N_2>O_2$ in the air composition (partial pressure). They include activated alumina, activated carbon and a mixture of them in addition to synthetic zeolite. The quantities of the adsorbents 9a and 10a to be packed are determined by the amount of air to be treated and other factors.

In the first low temperature adsorption tower 9, the pretreated air 1b is subjected to an adsorption treatment at a primary treatment temperature, −60° C. to −70° C., for example. This treatment removes the chemical components remaining in the pretreated air 1b and the same time further brings down the dew point. The second low temperature adsorption tower 10 further puts the primary treated air 1c from the first low temperature adsorption tower 9 to an adsorption treatment at a still lower temperature, −140° C. to −180° C., for example. This treatment further reduces the chemical components and brings down the dew point. In this manner, a secondary treatment air or super clean air 1e with the concentration of the chemical components and the dew point brought down to a specific targeted level is produced as will be evident from the test results which will be described later.

The first heat exchanger 12 is provided in the air flowing path between the room temperature adsorption tower 7 and the first low temperature adsorption tower 9. This first heat exchanger 12 cools down to the aforesaid primary treatment temperature the pretreated air 1b which has passed through the room temperature tower 7. The second heat exchanger 13 is installed in the air flowing path between the two low temperature towers 9 and 10, and cools to the secondary treatment temperature the primary treated air 1c that has passed through the first low temperature adsorption tower 9. The cooling of those treated airs 1b and 1c is effected utilizing the cooling energy produced in the nitrogen producing apparatus 30.

As set forth above, the low temperature gas 3f from the expansion turbine 38 is a gas obtained by further expanding with the expansion turbine 38 and bringing to a lower temperature the low temperature the low temperature gas 3e which was obtained by the deep freeze separation treatment in the rectifying tower 37. As cool as or cooler than the low temperature adsorption treatment temperature, the low temperature gas 3f has sufficient cooling energy to cool the aforesaid treated airs 1b and 1c. In the present example, therefore, the low temperature gas 3f is introduced into the cooling source heat exchanger 15 where the super clean air 1e flowing out of the second low temperature adsorption tower 10 is cooled. The cooled super clean air 1e from the cooling medium source heat exchanger 15 is then led to the second heat exchanger 13 and then to the first heat exchanger 12 to cool down the airs 1b and 1c to be treated to the treatment temperature as indicated above. The super clean air 1e that has passed through the first heat exchanger 12 is brought up to room temperature in a heat exchange with the airs 1b and 1c to be treated at the heat exchangers 12 and 13, and supplied to the specific application areas 16 of super clean air. On the other hand, the low temperature gas 3g used as a cooling medium, that is the low temperature gas 3f that has passed through the cooling source heat exchanger 15 is led into the main heat exchanger 36 of the nitrogen producing unit 30 as mentioned above.

The respective adsorption towers 7, 9 and 10 are formed in pairs as shown in FIGS. 1 and 3. As the pair of room temperature adsorption towers 35 and 35 function in the nitrogen producing apparatus 30, the adsorption towers 7, 9 and 10 on one side are in the process of adsorption, when the other towers 7, 9 and 10 regenerate and cool the adsorbents 7a, 9a and 10a. This way, the adsorption process and the regeneration and cooling process are alternated repeatedly between the pairs of towers every specific time.

In the room temperature adsorption tower 7 section, when one tower 7 is in the process of adsorption, the regeneration treatment gas 23 is heated by a heater 20 and supplied continuously to the other room temperature tower 7 for a specific time to heat and regenerate the adsorbent 7a in that adsorption tower 7. This regeneration treatment heats the adsorbent 7a to some 120° C. to release and discharge the moisture and carbon dioxide gas and part of the aforementioned chemical components adsorbed on the adsorbent 7a. After that, the cooling treatment gas 24 is supplied continuously, without being heated by the heater 20, to the regenerated room temperature adsorption tower 7 for a specific time to cool this tower 7 and the adsorbent 7a packed therein to the level of the adsorption treatment temperature. In this manner, the adsorption process and the regeneration and cooling process are carried out in parallel, the former on one room temperature adsorption tower 7 and the latter on the other room temperature adsorption tower 7. In this process, the surplus gas or exhaust gas from the nitrogen producing apparatus 30 is used as the whole regeneration, cooling treatment gases 23 and 24, thereby improving the production yield of the super clean air 1e. In the present example, of the low temperature gas 3g which has passed through the expansion turbine 38 and the heat exchangers 15 and 36, the gas 3h other than the gas used as regeneration, cooling treatment gases 47 and 48 in the room temperature adsorption tower 35 is used as the whole of the regeneration, cooling treatment gases 23 and 24.

While the low temperature adsorption towers 9 and 10 on one side are in the process of adsorption, the nitrogen gas or the regenerating gas 25 is heated by the heater 21 and then supplied continuously to the second low temperature tower 10 and then the first low temperature tower 9 on the other side for a specific time to regenerate the adsorbents 9a and 10a in those adsorption towers 9 and 10 by heating the same to some 120° C. The purpose of this regeneration treatment is to release and discharge from those adsorbents 9a and 10a the chemical components adsorbed therein such as CO, $CO_2$, HC, $NH_3$, $Cl_2$, NOx, SOx, P compounds and B compounds. Then, the low temperature nitrogen gas or the cooling treatment gas 26 are supplied to the low temperature towers 9 and 10 on the other side to cool the adsorbents 9a and 10a packed in the adsorption towers 9 and 10 to the level of the respective adsorption treatment temperatures. Thus, the adsorption process and the regeneration and cooling process are carried out in parallel, the former in the low temperature adsorption towers 9 and 10 on one side and the latter in the other low temperature adsorption towers 9 and 10. Since synthetic zeolite or the like that adsorbs nitrogen preferentially is used as adsorbents 9$a$ and 10$a$ as mentioned and in addition the nitrogen gas is used as the regeneration treatment gas 25 and the cooling treatment gas 26, it is ensured that the possibility is precluded of explosion of self-decomposable gases or flammable gases adsorbed at the low temperature. The regeneration, cooling treatment gases 25 and 26 used for the regeneration and cooling treatment of those low temperature adsorption towers 9 and 10 are the product gases 3$b$ and 3$c$ produced in the nitrogen producing apparatus 30 juxtaposed with the super clean air producing apparatus 2. In other words, the regeneration treatment gas 25 used is part 3'$b$ of the nitrogen gas 3$b$ which has passed through the main heat exchanger 36 and has been brought up to room temperature as shown in FIGS. 1 and 3. That gas 3'$b$ is heated by the heater 21 and supplied to the second low temperature adsorption tower 10 and the first low temperature adsorption tower 9 not in the process of adsorption. Used as cooling treatment gas 26 is part 3'$c$ of the liquid nitrogen 3$c$ produced in the rectifying tower 37 and stored in the storage tank 45, which is supplied to the second low temperature adsorption tower 10 and the first low temperature adsorption tower 9 after regeneration treatment through the cooling source heat exchanger 15 as shown in FIGS. 1 and 3. This liquid nitrogen 3'$c$ also is used as a cooling means to cool the super clean air 1$e$ in the cooling source heat exchanger 15 and is utilized as cooling energy for the low temperature adsorption process when the nitrogen producing apparatus 30 is shut down for periodical inspection or repair. When the nitrogen producing apparatus 30 is stopped, the low temperature gases 3$e$ and 3$f$ can not be used as that cooling energy. But, by using the liquid nitrogen 3'$c$ as that cooling energy, the low temperature adsorption process can be carried out, which enables the super clean air producing apparatus 2 to continue in operation.

By the way, as the adsorption treatment temperature is lowered within a range between −60° C. and −180° C., the removal rate (adsorption capacity) of the chemical components rises. That is because the molecular kinetic energy decreases and the physical adsorption capacity rises as the temperature goes down in the range of temperature at which the gaseous state is maintained before solidification. On this ground, it is most preferable to carry out adsorption treatment near the solidifying point if the chemical components are to be removed by adsorption effectively. On the other hand, the atmospheric air contains quite a variety of chemical components with different solidifying points.

Yet, it is possible to remarkably lower the processing temperature, improve the rate of removal of chemical components, and at the same time greatly lower the dew point this way: classifying the chemical components into a plurality of chemical component groups each component group including chemical components whose respective solidification temperatures are close to each, dividing the low temperature adsorption treatment process into a number of adsorption steps equal to the number of chemical component groups, and setting the treatment temperature for each group at a temperature close to, but somewhat higher than the solidification temperature range for each chemical component group. By starting with the adsorption step having the highest treatment temperature, proceeding to the step with the second highest temperature and so forth, the chemical components may be adsorbed and removed group by group, starting with the group having the highest solidification temperature range and ending with the group having the lowest solidification temperature range.

Figure 4:
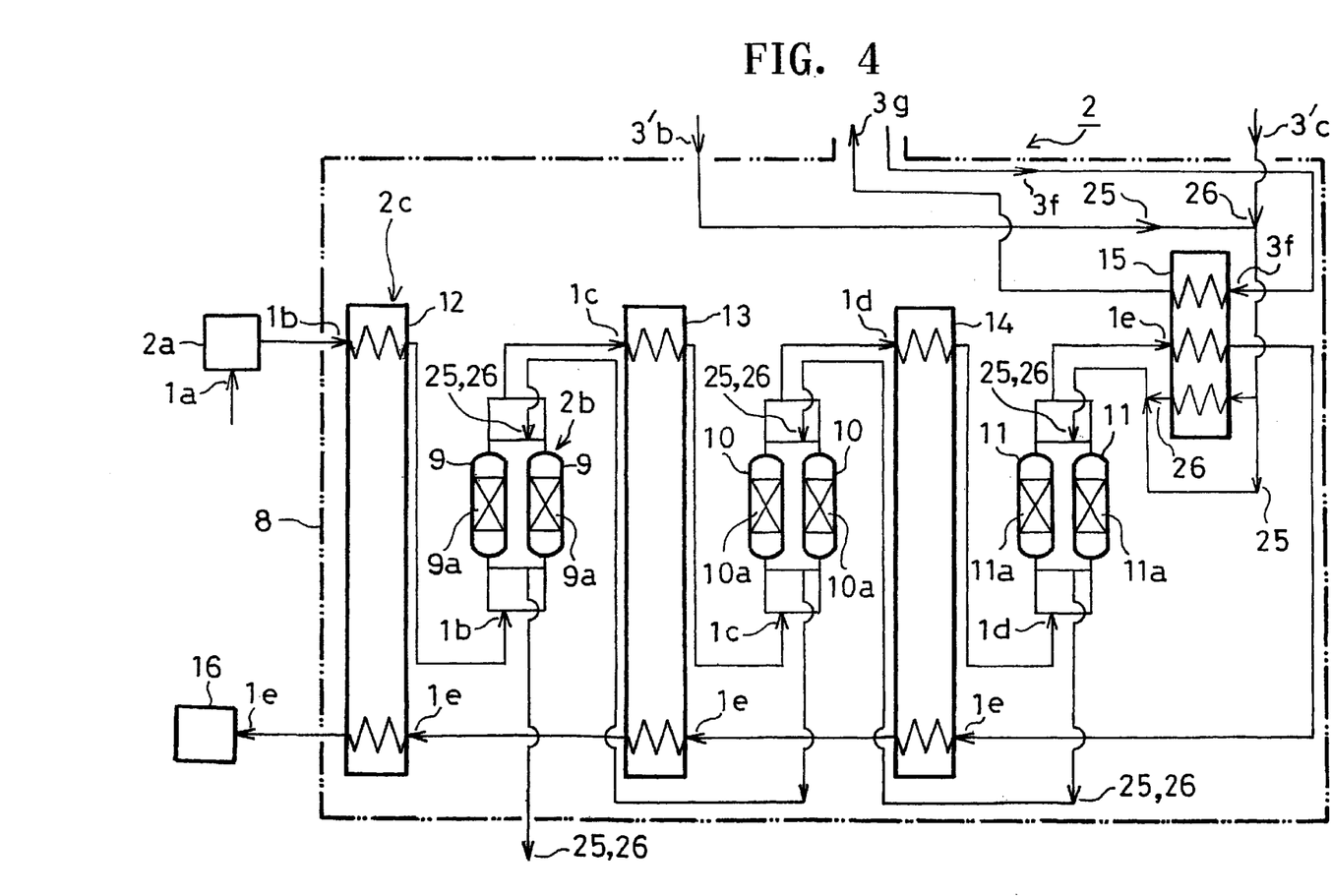
FIG. 4 is a system diagram showing a variation of the apparatus for producing super clean air according to the present invention.

This effect can be achieved more remarkably as the number of low temperature adsorption steps increases, but from the practical viewpoint of treatment efficiency and economy, it is enough to adsorb chemical components at two stages by first and second low temperature adsorption towers 9 and 10 as shown in FIG. 1, or at three stages by further providing a third low temperature adsorption tower 11 as shown in FIG. 4.

For adsorption treatment in three stages, a third low temperature adsorption tower 11 is provided on the downstream side of the second low temperature tower 10 as shown in FIG. 4, the tower 11 packed with the same adsorbent (synthetic zeolite or the like) 11$a$ as the adsorbent 10 a for the tower 10. And a third heat exchanger 14 is provided between the two low temperature adsorption towers 10 and 11. The secondary treated air Id from the second low temperature adsorption tower 10 is further cooled in the third heat exchanger 14 in a heat exchange with the super clean air 1$e$ from the cooling source heat exchanger 15 and then led to the third low temperature adsorption tower 11 for low temperature adsorption treatment. Thus, the super clean air 1$e$ is obtained. The respective temperature are set preferably as in the following: the pretreated air 1$b$ is treated in the first low temperature adsorption tower 9 as well as cooled in the first heat exchanger 12 both at −60° C. or so; the primary treated air 1$c$ is treated in the second low temperature adsorption tower 10 as well as cooled in the second heat exchanger 13 both at −100° C. or so; and the secondary treated air 1$d$ is treated in the third low temperature adsorption tower 11 as well as cooled in the third heat exchanger 14 both at −150° C. to −180° C.

When the air is adsorption treated at the three stages in this way, the following chemical components are removed in the following stages: HF, $SO_2$, $NH_3$ etc. in the adsorption treatment at −60° C. in the first low temperature adsorption tower 9; $SF_6$, $C_2F_6$, $H_2S$, $N_2O$ etc. in the adsorption treatment at −100° C. in the second low temperature adsorption tower 10; and $CF_4$, NO, $CH_4$, CO etc. in the adsorption treatment at −150° C. in the third low temperature adsorption tower 11. Needless to say, part of these chemical components are removed in the adsorption treatment in any of the stages. For example, the chemical components $CF_4$, NO, $CH_4$, CO, etc. are primarily adsorbed and removed at the third low temperature tower 11 but are also adsorbed and removed to some extent at the first and the second low temperature adsorption towers 9 and 10.

It is to be understood that the present invention is not limited to the embodiment just described but improvements and variations are possible as necessary without departing from the basic principle of the present invention. While low temperature adsorption is effected in a plurality of stages in the embodiment just described, for example, the adsorption treatment may be carried out in the first low temperature adsorption tower 9 alone, depending on the quality required in the super clean air 1$e$, for instance when the number of chemical components to be removed is limited or the removal rate is not required to be so high and adsorption treatment at a temperature around −60° C. is sufficient. Needless to say, when adsorption treatment is carried out only at the adsorption tower 9, it is possible to lower the treatment temperature to around −150° C. However, since the adsorption capacity falls in treating the chemical components with a high solidifying point as described above, and depending on the concentration of the relevant chemical components, the chemical components may solidify and clog the piping system of the heat exchanger, etc. Therefore, it is desirable to provide two or more stages for the treatment process. It is also noted that while provision of one to three stages is sufficient for the adsorption treatment to be carried out in a temperature range from −60° C. to −180° C., four or more stages may be adopted depending on the quality required in the super clean air. The treatment temperature in the respective stages can be freely chosen between −60° C. and −180° C. depending on what chemical components to remove.

The pretreatment by the pretreatment means 2a can be dropped depending on the properties and composition of the atmosphere from which the material air 1a is taken and the quality required in the super clean air as, for example, in case the dew point of the air 1a is lower than the temperature for low temperature adsorption treatment. Also, the pretreatment can be so arranged that the material air 1a collected from the atmosphere is subjected to a treatment such as the aforesaid room temperature adsorption treatment before being supplied to the low temperature adsorption treatment means 2b (and the cooling means 2c). It is also noted, further, that the used air from the clean room, super clean air application area, or the like can be utilized as material air 1a to be pretreated or pretreated material air, that is, the pretreated air 1b. In the tunnel-type wafer transport system mentioned earlier when the super clean air is to be circulated, it can be so configured that the used super clean air discharged out of the tunnel is supplied to the low temperature adsorption treatment means 2b (and the cooling means 2c) as the above-mentioned material air (pretreated air) 1b to undergo low temperature adsorption treatment. This treated air or super clean air can be fed and circulated in that tunnel.

In the aforesaid example, the low temperature adsorption means 2b and the cooing means 2c are installed within the cold box 8, generally an iron case having a heat insulating material therein. In case where the surrounding atmosphere will place a high thermal load on the apparatus, the means 2b and 2c or their constituent parts such as the adsorption tower and heat exchanger can be placed inside a vacuum heat insulating container.

The nitrogen producing apparatus 30 to which the super clean air producing apparatus 2 is juxtaposed may be of any type. One which produces not liquid nitrogen 3c but nitrogen gas 3b alone may be used. In such a nitrogen producing apparatus for production of nitrogen gas 3b only, the cooling energy increases. By making the most use of that, the production of super clean air 1e or the volume of low temperature adsorption treatment can be raised to, say 23,000 $Nm^3$/h. Whether the nitrogen producing apparatus is for production of liquid nitrogen or not, of course, it is possible to increase the production of the super clean air 1e if the cooling energy is increased by raising the volume of treated air through the nitrogen producing apparatus.

Figure 5:
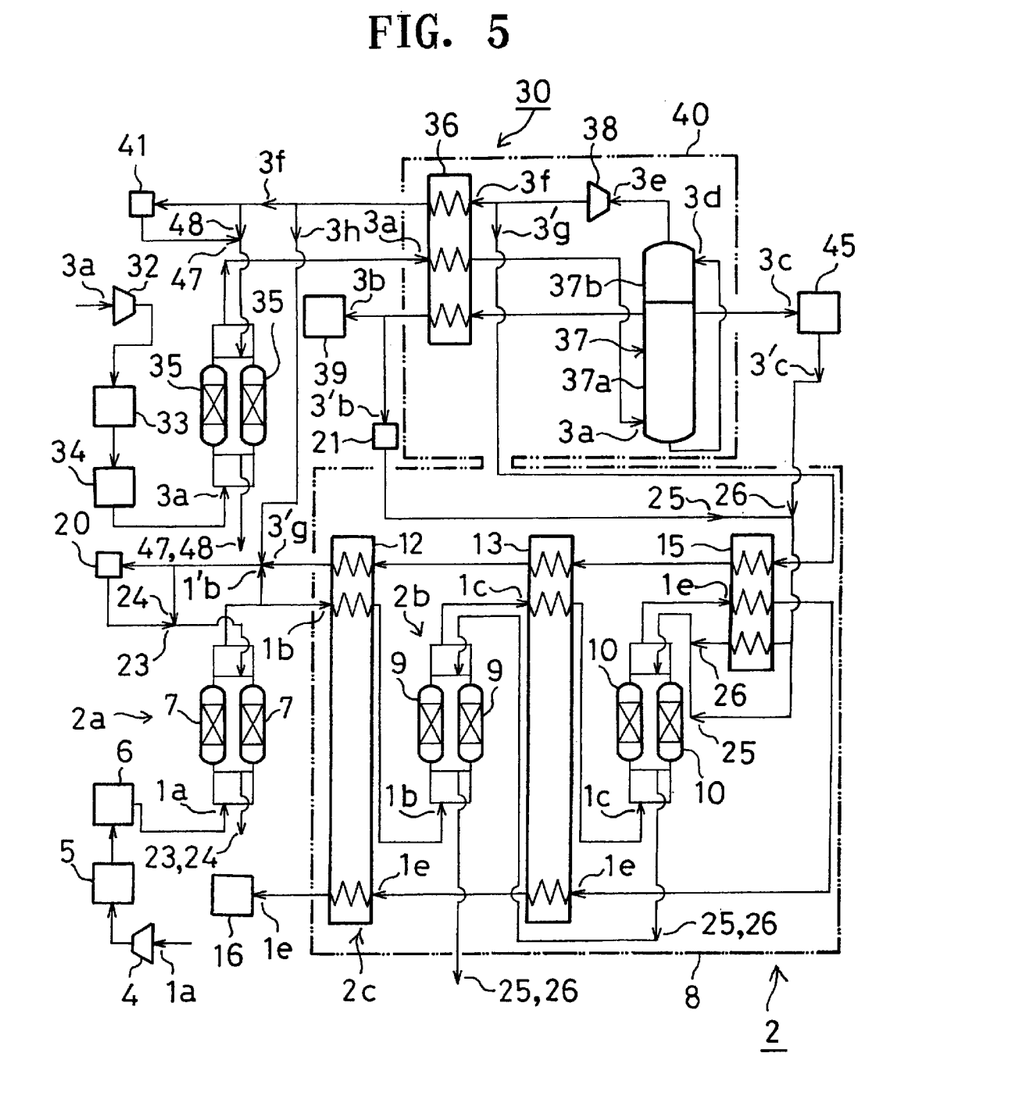
FIG. 5 is a system diagram showing still another variation of the apparatus for producing super clean air according to the present invention.
Figure 6:
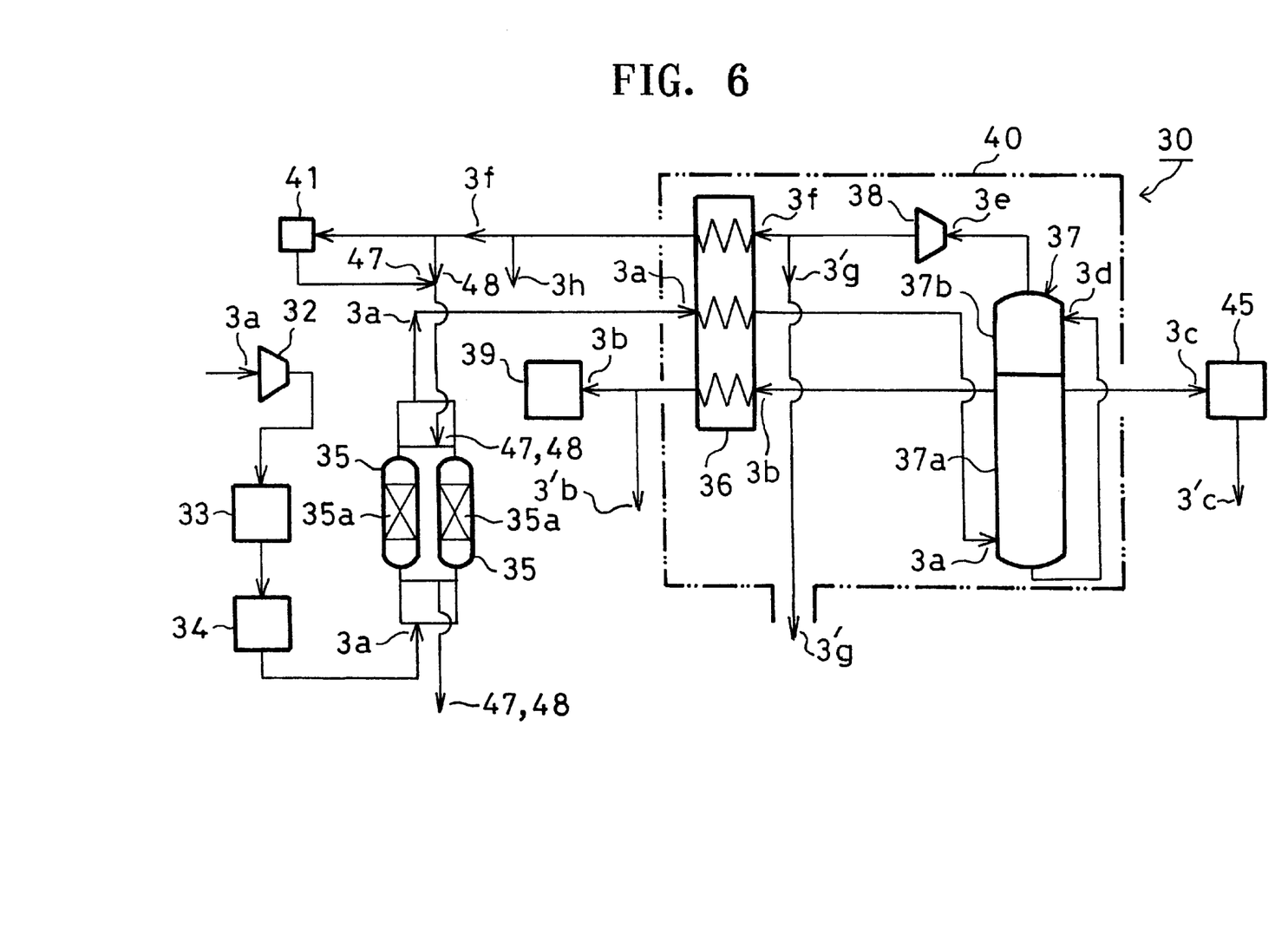
FIG. 6 is an enlarged diagram of the deep freeze separation-type nitrogen producing apparatus forming a main part in FIG. 5.
Figure 7:
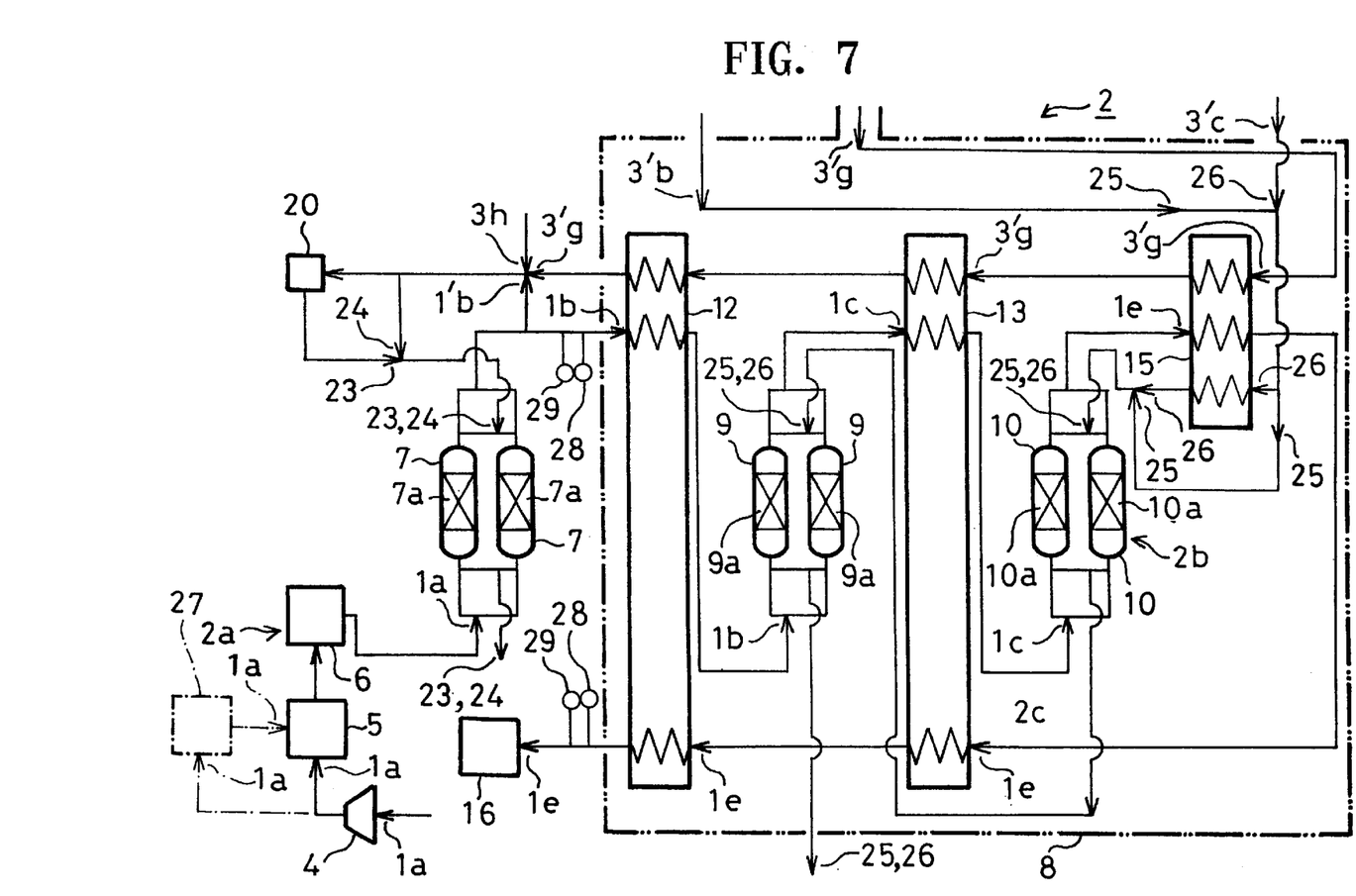
FIG. 7 is an enlarged diagram of the apparatus for producing super clean air forming another main part in FIG. 5.

Another possible way to cool the airs 1b and 1c to be treated down to the aforesaid treatment temperature is shown in FIGS. 5 to 7. To illustrate, part 3'g of the low temperature gas 3f proceeding from the expansion turbine 38 to the main heat exchanger 36 is led to the cooling source heat exchanger 15 to cool the super clean air 1e flowing out of the second low temperature adsorption tower 10. Then, the cooled super clean air 1e and the low temperature gas 3'g are led from the cooling source heat exchanger 15 to the second heat exchanger 13 and then the first heat exchanger 12. Thus the airs 1b and 1c to be treated are cooled down to the above-mentioned treatment temperature. This process also may be designed this way: the gas 3'g having been used as cooling medium or the gas 3'g heat-recovered in the heat exchangers 12, 13 and 15 (the gas coming out of the first heat exchanger 12) is supplied to the room temperature adsorption tower 7 as regenerating and cooling treatment gases 23 and 24. The gas 3'g is supplied along with part 1'b of the pretreated air 1b and the gas 3h other than the gas used as the regenerating and cooling treatment gases 47 and 48 for the room temperature adsorption tower 35. In the example shown in FIGS. 5 to 7, no catalyst tower 27 is provided and the pretreatment means 2a is so designed that the material air 1a is compressed by the compressor 4 and then cooled to the level of room temperature by the after cooler 5 and the refrigerator 6 to condense and remove the moisture. The material air 1a is further led to the room temperature adsorption tower 7 where the moisture and carbon dioxide gas are adsorbed and removed as much as possible. Except for those points, the configuration is identical with that shown in FIGS. 1 to 3. In FIGS. 5 to 7, the same constituent parts are indicated with the same reference numbers as those in FIGS. 1 to 3. So, no detailed description is given.

EXAMPLE

Figure 2:
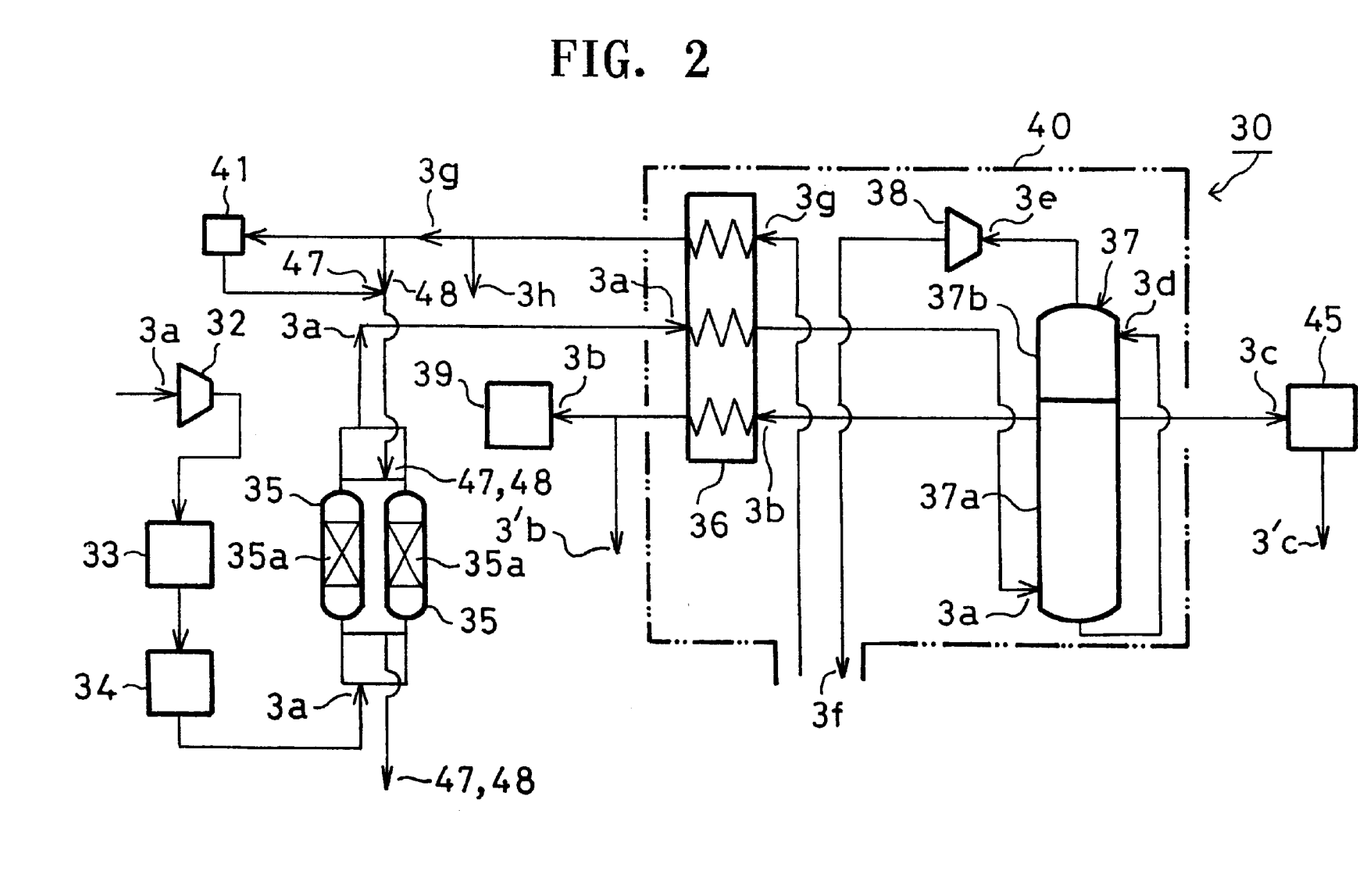
FIG. 2 is an enlarged diagram of a deep freeze separation-type nitrogen producing apparatus forming a main part in FIG. 1.

The present invention was put to practice to produce super clean air 1e using the super clean air producing apparatus 2 and the nitrogen producing apparatus 30 as shown in FIGS. 1 to 3.

In the nitrogen producing apparatus 30, material air 3a was collected from the atmosphere (at a temperature of 15° C. to 21° C., humidity (RH) of 60 to 80%) at the rate of 8,250 $Nm^3$/h and was compressed to 7.0 $kg/cm^2G$ by the compressor 32. The material air was then cooled to 5° C. by the cooler 33 and the refrigerator 34 to condense and separate the moisture. Then, the moisture, carbon dioxide gas etc. were adsorbed and removed in the room temperature adsorption tower 35. The room temperature adsorption tower 35 had been packed with 1,770 kg of an adsorbent 35a prepared of a mixture of activated alumina and synthetic zeolite.

The material air 3a coming from the room temperature tower 34 at the rate of 8,250 $Nm^3$/h was cooled in the main heat exchanger 36 and supplied to the high pressure tower 37a in the rectifying tower 37. In the rectifying tower 37, the air was rectified and separated within the high pressure tower 37a, from the top of which nitrogen gas 3b and liquid nitrogen 3c were obtained at the rate of 2,900 $Nm^3$/h and 100 $Nm^3$/h respectively. The nitrogen gas 3b was bought to room temperature by passing through the main heat exchanger 36. From the bottom of the higher pressure tower 37a, the liquid air 3d (pressure of 2.5 to 3.0 $kg/cm^2G$ with an oxygen concentration of 34.7%) was supplied to the low pressure tower 37b to vaporize. From the low pressure tower 37b, the vaporized gas 3e (pressure of 2.7 $kg/cm^2G$ at a temperature of −144° C.) was released at the rate of 5,250 $Nm^3$/h. This gas 3e, though not shown, was partly cooled in the main heat exchanger 36 and expanded to 0.45 $kg/cm^2G$ by the expansion turbine 38 and cooled down to −179° C. Entering the super clean air producing apparatus 2, the gas 3e gave cooling energy there and became a low temperature gas 3g at −170.5° C. and then returned to the nitrogen producing apparatus 30. Together with the aforesaid nitrogen gas 3b, the low temperature gas 3g was led to the main heat exchanger 36 to cool the material air 1a. As mentioned earlier, the cooling medium necessary to generate 2,900 $Nm^3$/h of nitrogen gas 3b and 100 $Nm^3$/h of liquid nitrogen 3c is sufficiently produced by the conditions which gave the cooling energy. The gas 3g from the main heat exchanger 36 was available at the rate of 5,250 $Nm^3/h$. This gas was supplied to the room temperature adsorption tower 35 not in the adsorption process as regeneration and cooling treatment gases 47 and 48. The amount of gas required for regeneration treatment and cooling treatment of the room temperature adsorption tower 35 was 1,250 $Nm^3/h$ That left 4,000 $Nm^3/h$ as surplus.

In the super clean air producing apparatus 2, meanwhile, 15,000 $Nm^3/h$ of material air 1a (at a temperature of 15° C. to 21° C., relative humidity (RE) of 60 to 80%) taken from the atmosphere was compressed to 2.0 $kg/cm^2G$ by the oil-free reciprocating compressor 4 and introduced in the catalyst tower 27 for oxidation treatment in contact with a noble metal catalyst. The material air 1a was then cooled to 30° C. by the aftercare 5 and further to 5° C. by the refrigerator 6. After the moisture was condensed and separated, the material air 1a was cleared of the chemical components such as moisture and carbon dioxide in the room temperature adsorption tower 7. Thus obtained was 15,000 $Nm^3/h$ of the pretreated air 1b. The room temperature adsorption tower 7 had been packed with 5,400 kg of an adsorbent 7a prepared of a mixture of activated alumina and synthetic zeolite. An examination of the pretreated air 1b by analyzers 28 and 29 which will be described later showed that $H_2O$ was reduced to 0.01 ppm or less, $CO_2$ to 0.3 ppm or less, CO to 2 ppm or less, $CH_4$ to 2 ppb or less and $H_2$ to 2 ppb or less. It was also confirmed that the other chemical components such as $NH_3$, NO, HCl and HF were also removed to some extent.

As will be described later, 4,000 $Nm^3/h$ required for the regeneration and cooling treatment gases 23 and 24 can be well covered with the surplus gas 3h from the nitrogen producing apparatus 30. Therefore, the pretreated air 1b of 15,000 $Nm^3/h$ obtained as above was all subjected to low temperature adsorption treatment in the low temperature adsorption treatment means 2b in two stages while being cooled by the cooling means 2b. In this way, super clean air 1e was produced in 15,000 $Nm^3/h$.

That is to say, 15,000 $Nm^3/h$ of the pretreated air 1b was cooled to -60° C. in the first heat exchanger 12, and then put to adsorption treatment at a primary treatment temperature of -60° C. in the first low temperature adsorption tower 9. The primary treated air 1c from the first low temperature adsorption tower 9 was cooled down to -150° C. in the second heat exchanger 13 and subjected to adsorption treatment at a secondary treatment temperature of -150° C. in the second low temperature adsorption tower 10. The respective low temperature adsorption towers 9 and 10 had been packed each with 380 kg of synthetic zeolite with fine pores 5 Å in diameter as adsorbents 9a and 10a.

Then, the cooling energy from the nitrogen producing apparatus, that is, 5,250 $Nm^3/h$ of the low temperature gas 3f (-179° C.) was introduced in the cooling source heat exchanger 15. The heat exchange with that low temperature gas 3f and the cooling treatment gas 26 (50 $Nm^3/h$ of liquid nitrogen 3'c) cooled the super clean air 1e from the second low temperature adsorption tower 10. This cooled super clean air 1e was then led through the second heat exchanger 13 and then the first heat exchanger 12 in that order whereby the primary treated air 1c was cooled down to -150° C. and the pretreated air 1b to -60° C.

Meanwhile, the aforesaid adsorption process and the following regenerating and cooling process were switched between the adsorption towers 7, 9 and 10 on one side and the adsorption towers 7, 9 and 10 on the other side every specific hours—every 4 hours between the room temperature towers 7 and 7 and 24 hours between the low temperature adsorption towers 9 and 9 and also between 10 and 10.

The regeneration and cooling process of the normal adsorption tower 7 was conducted using the surplus gas 3h of 4,000 $Nm^3/h$ from the nitrogen producing apparatus 30.

That is, this gas 3h was used as the whole regeneration and cooling treatment gases 23 and 24. In the process, 4,000 $Nm^3/h$ of the regeneration treatment gas 23 was heated to 130° C. by the electric heater 20, then continuously supplied to the room temperature adsorption tower 7 on the other side for 1.5 hours to heat to 120° C. the absorbent 7a packed in that room temperature adsorption tower 7 on the other side for regeneration. After that, the cooling treatment gas 24 was continuously supplied to the room temperature adsorption tower 7 on the other side for two hours without heating by the heater 20 at the rate of 4,000 $Nm^3/h$. This way, the room temperature adsorption tower 7 and the adsorbent 7a were cooled down to 8° C.

Part 3+b (50 $Nm^3/h$) of the nitrogen gas 3b produced in the nitrogen producing apparatus 30 was heated to 120° C. by the electric heater 21 as regeneration treatment gas 25 for the low temperature adsorption towers 9,10. This gas 3'b was then continuously fed to the first and second low temperature adsorption towers 9 and 10 not in the adsorbing process for 14 hours. Thus, the adsorbents 9a and 10a packed in the low temperature adsorption towers 9 and 10 were gradually heated to 110° C. and regenerated. After that, part 3'c (50 $Nm^3/h$) of the liquid nitrogen 3c produced in the nitrogen producing apparatus 30 was led through the cooling source heat exchanger 15 and continuously supplied as the cooling treatment gas 26 to the second low temperature adsorption tower 10 and the first low temperature adsorption tower 9 in that order for 8 hours without heating by the electric heater 21. This way, the second low temperature adsorption tower 10 and its adsorbent 10a were cooled down to -150° C. And, the first low temperature adsorption tower 9 and the adsorbent 9a were cooled down to -60° C.

The concentrations of the chemical components and the dew point were measured of the air 1b which have passed through the room temperature adsorption tower 7 and the super clean air 1e which have passed through the first heat exchanger 12. The measurements were taken using a chemical composition analyzer 28 (model GC-MS, QP-300/ Shimadzu Inc.) and a moisture content analyzer 29 (model SYSTEM 11/Panametric) connected to the air outlet and inlet of the cold box 8 as shown in FIG. 3.

The chemical components in air are so diverse, varied and changeable in accordance with the atmospheric conditions under which the material air is collected that it is difficult to determine and analyze all of the components precisely. For measurement of the concentration of the chemical components in the super clean air 1e, therefore, some of the chemical components considered to be difficult to remove by adsorption treatment were chosen, and their concentrations were measured. Chosen for the measurement were $CH_4$, $N_2O$, CO, NO and $SO_2$, which shall be hereinafter called "specified chemical components."

The analysis results are shown in Table 1. The measurement showed that the specified chemical components in the super clean air 1e were all reduced to, or below, the detection limit 1 ppb of the chemical component analyzer 28. The dew point of the air 1e, too, was lowered to not higher than -110° C. at which wafers will not be oxidized nor contaminated as described earlier.

TABLE 1

|  |  | Pretreated air | Super clean air |
|---|---|---|---|
| Chemical components | $CH_4$ | 2 ppb | <1 ppb |
|  | $N_2O$ | 0.07 ppm | <1 ppb |
|  | CO | 2 ppb | <1 ppb |
|  | NO | 0.02 ppm | <1 ppb |
|  | $SO_2$ | 0.2 ppm | <1 ppb |
| Dew point |  | −100° C. | <−110° C. |

Comparative Example

In parallel, a comparative super clean air 1e was produced under the same conditions except that the whole regeneration and cooling treatment gases 23 and 24 (4,000 $Nm^3/h$) for the room temperature adsorption tower 7 were covered by part of the pretreated air 1b and that liquid nitrogen (200 $Nm^3/h$) was used in place of the low temperature gas 3f required as a cooling medium for the adsorption process. That produced 11,000 $Nm^3/h$ of super clean air 1e as against 15,000 $Nm^3/h$ of the material air 1a.

A comparison was made in the yield of production of super clean air 1e and the specific cooling energy consumption and specific electricity consumption for production of super clean air 1e between the example of the present invention and the comparative example. In the yield of production, while the comparative example was 73%, the example of the present invention was 100%, which means that the air introduced was all turned into super clean air. The example of the present invention was some 32% higher. In the present example, therefore, the specific electricity consumption by the compressor 4 for production of super clean air 1e was about 0.053 $kw/Nm^3$ as against some 0.07 $kw/Nm^3$ in the comparative example. The electricity consumed by the compressor 4 to compress the material air 1a was 800 kw. In the comparative example, furthermore, 250 $Nm^3/h$ of liquid nitrogen was needed including liquid nitrogen 3'c (50 $Nm^3/h$) for cooling treatment of the low temperature adsorption towers 7 and 9. The present example, on the other hand, required only the liquid nitrogen 3'c (50 $Nm^3/h$) for cooling treatment. Thus, the specific consumption of liquid nitrogen, too, was drastically reduced to some 1/5 that of the comparative example.

Test

Since it is difficult to determine all the chemical components contained in the material air collected from the atmosphere as mentioned above, there is no means to accurately confirm how efficient the present invention is in removing the chemical components by the above mentioned low temperature adsorption treatment as long as the material air is taken from the atmosphere.

Therefore, a further test was conducted, with which results the ability of eliminating the chemical components according to the invention was evaluated.

Figure 8:
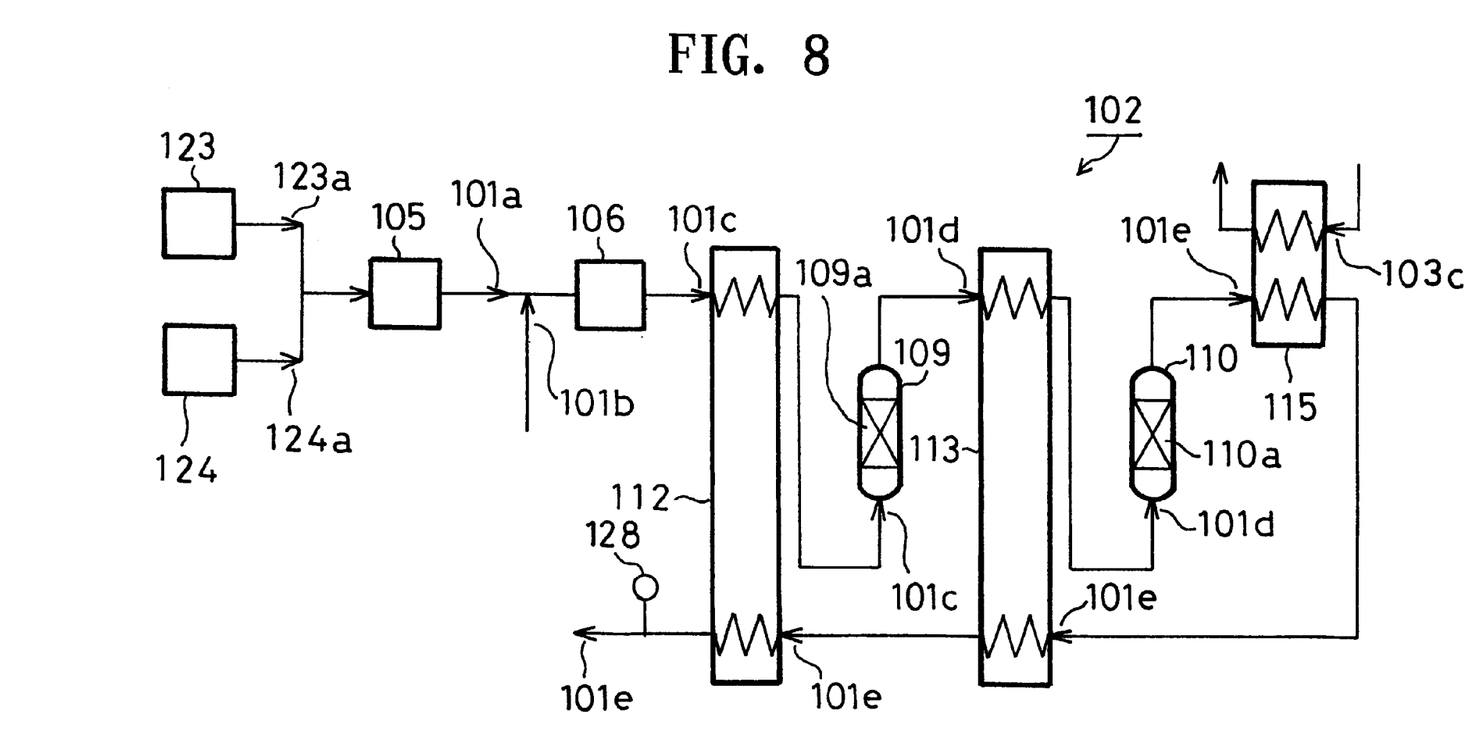
FIG. 8 is a system diagram showing a testing apparatus.

For the test, a material air was artificially prepared of a known composition of the chemical components. This material air or artificial air was subjected to low temperature adsorption treatment using a tester 102 identical in construction to the super clean air producing apparatus 2 used in the above example (without the pretreatment means 2a). And its treatment performance, that is the ability of eliminating the chemical components, was evaluated.

Material oxygen 123a and material nitrogen 124a were first obtained using an ultra high purity oxygen purifier 123 (model: TOP-300; capacity: 30 $Nm^3/h$) and an ultra high purity nitrogen purifier 124 (model: TIP-1000; capacity: 100 $Nm^3/h$), both made by Taiyo Toyo Sanso Co., Ltd., Japan. The material oxygen 123a and material nitrogen 124a thus obtained were mixed by a mixer 105 to produce a composite air 101a with a known composition, that is, $O_2$: 21%; $N_2$: 79%; pressure: 2 $kg/cm^2G$; and flow rate: 99 $Nm^3/h$.

The impurities in the material oxygen 123a were CO<3 ppb, $CO_2$<1 ppb, THC (total hydrocarbons)<1 ppb, $H_2$<1 ppb, NOx<1 ppb, SOx<1 ppb, $NH_3$<1 ppb, $Cl_2$<1 ppb. The impurities in the material nitrogen 124a were CO<1 ppb, $CO_2$<1 ppb, THC<1 ppb, $H_2$<1 ppb, NOx<1 ppb, SOx<1 ppb, $NH_3$<1 ppb, $Cl_2$<1 ppb. The impurities in the composite air were CO<2 ppb, $CO_2$<1 ppb, THC<1 ppb, $H_2$<1 ppb, NOx<1 ppb, SOx<1 ppb, $NH_3$<1 ppb, $Cl_2$<1 ppb. The dew points of the material oxygen 123a, material nitrogen 124a and composite air 101a were all not higher than −100° C.

The aforesaid composite air 101a was then mixed in a mixer 106 with a $N_2$ based mixture gas 101b (1 $Nm^3/h$) which contained the specific concentrations of chemical components, hereinafter referred to as the "added chemical components" (CO: 0.2 ppm; $CO_2$: 100 ppm; $CH_4$: 0.2 ppm; NO: 100 ppm; $SO_2$: 50 ppm; $NH_3$: 10 ppm; $Cl_2$: 10 ppm). Thus obtained was an artificial air 101c of 100 $Nm^3/h$. This artificial air 101c was allowed to pass through a first heat exchanger 112, a first low temperature adsorption tower 109, a second heat exchanger 113 and a second low temperature tower 110 in that order to produce super clean air 101e.

The respective low temperature adsorption towers 109 and 110 was packed each with 10 kg of synthetic zeolite with fine pores 5 Å in diameter as adsorbents 109a and 110a. In the first low temperature adsorption tower 109, the artificial air 101c cooled by a first heat exchanger 112 was subjected to adsorption treatment at −60° C. In the second low temperature adsorption tower 110, an adsorption treatment at −150° C. was given to the artificial air or the primary treated air 101d adsorption-treated in the first low temperature tower 109 and cooled in the first heat exchanger 112.

Prior to starting the adsorption treatment, the composite air 101a alone was allowed to pass through and cooled in a heat exchange with a liquid nitrogen 103c in a cooling source heat exchanger 115. This cooled composite air was then led from the cooling source heat exchanger 115 to the second heat exchanger 113 and then the first heat exchanger 112. By so doing, the airs 101c and 101d heading for the respective low temperature adsorption towers 109 and 110 were maintained at the described adsorption treatment temperatures by the respective heat exchangers 112 and 113. In the adsorption treatment, the super clean air 1e was cooled in a heat exchange with the liquid nitrogen 103c in the heat exchanger 115 and then was allowed to pass through the second heat exchanger 113 and then the first heat exchanger 112. This way, the airs 101c and 101d heading for the respective low temperature adsorption towers 109 and 110 were cooled to the aforesaid adsorption treatment temperatures in a heat exchange with that super clean air 1e.

At the end of lapse of 12 hours after the start of the adsorption treatment, the low temperature adsorption treated artificial air or super clean air 101e was put to analysis to detect the aforesaid chemical components by the same chemical composition analyzer 128 (Model GC-MS, QP-300) as the aforesaid analyzer 28 installed at the outlet of the first heat exchanger 112. After that, the aforesaid material nitrogen 124a was heated to 120° C. Then, as in Example 1, the material nitrogen 124a was continuously fed for 5 hours to the respective low temperature adsorption towers 109 and 110 which had completed the adsorption process, whereby the adsorbents 109a and 110a were heated to 120° C., regenerated and cooled. After that regeneration and cooling treatment, too, the adsorption treatment of the artificial air was conducted under the same conditions as mentioned above. Then, the concentrations of the added chemical components in the artificial air or super clean air 101e were measured by the aforesaid analyzer 128.

The results are shown in Table 2. The added chemical components in the super clean air 101e—CO, $CO_2$, $CH_4$, NO, $SO_2$, $NH_3$ and $Cl_2$—were all not higher than the detection limit of the chemical composition analyzer 128—1 ppb. In the low temperature adsorption treatment conducted following the regeneration and cooling treatment, too, the results obtained were the same. The added chemical components in the super clean air 101e were all not higher than 1 ppb.

Those test results indicate that the low temperature treatment according to the present invention can reduce the chemical components contained in the material air taken from the atmosphere of the chemical components down to not higher than one ppb, the detection limit of the chemical composition analyzer. The chemical components in the atmosphere vary depending upon the place where the air is collected but, in general, these components conform to what is described in "Chemistry of the Atmosphere (General Information on Chemistry No. 10)" edited by the Japan Chemical Association. The artificial air used in the test included the added chemical components in concentrations of from 2 to 10 times the concentrations set forth in this publication, these added chemical components (see Table 2) including in general those most difficult to remove by adsorption treatment. Therefore, based on the results obtained by this test, it is reasonable to assert that a super clean air equal to that produced in the test can be obtained by low temperature adsorption treatment of the actual atmospheric air.

TABLE 2

| | | Artificial air | Super clean air |
|---|---|---|---|
| Chemical components | CO | 2 ppb | <1 ppb |
| | $CO_2$ | 1 ppm | <1 ppb |
| | $CH_4$ | 2 ppb | <1 ppb |
| | NO | 1 ppm | <1 ppb |
| | $SO_2$ | 0.5 ppm | <1 ppb |
| | $NH_3$ | 0.1 ppm | <1 ppb |
| | $Cl_2$ | 0.1 ppm | <1 ppb |

As is evident from this description, it is possible, according to the present invention, to produce from atmospheric air as material air the super clean air efficiently in large quantities whose contents of the chemical components except oxygen, nitrogen and noble gases to the greatest possible extent and is extremely low in dew point. Therefore, the present invention will contribute greatly to development and innovation of various sectors including the tunnel-type wafer transport system in the semiconductor manufacturing and other fields where lack of sufficient supply of super clean air has hindered such innovative efforts.

The present invention, in addition, makes good use of cooling energy and gas from the low temperature separation-type nitrogen producing apparatus juxtaposed to the super clean air producing apparatus. That drastically improves the yield of super clean air and at the same reduces the specific energy consumption, substantially saving the costs of producing super clean air and greatly widening its application possibility.

What is claimed is:

1. A method of producing super clean air using a combination of a nitrogen-producing apparatus producing cool nitrogen and a super clean air producing apparatus, said method comprising the steps of:

cooling starting material air collected from the atmosphere to a temperature ranging from −60° C. to −180° C. with the cool nitrogen produced in the nitrogen-producing apparatus, and subjecting said material air to a low temperature adsorption treatment in said super clean air producing apparatus by an adsorbent under conditions of said temperature range so as to adsorb and remove chemical components other than nitrogen, oxygen and noble gases from the air and to produce super clean air.

2. A method according to claim 1, wherein said step of subjecting is conducted in twin absorption towers, whereby said twin absorption towers alternately adsorb impurities from the air, and are alternately regenerated using nitrogen from said nitrogen producing apparatus.

3. A method according to claim 2, wherein said step of cooling is conducted in a heat exchanger, upstream from said twin absorption towers.

4. A method according to claim 2, wherein said chemical components are present in said super clean air in an amount not greater than 1 ppb, and said super clean air has a dew point of not higher than −100° C.

5. A method according to claim 2, wherein said steps of cooling and subjecting are repeated with a plurality of heat exchangers and a plurality of twin adsorption towers.

6. A method according to claim 5, wherein said plurality of heat exchangers and twin adsorption towers adsorb a respective plurality of groups of chemical components so that each of the plurality of heat exchangers and twin adsorption towers operate at successively lower temperatures, and wherein each successively lower temperature is selected to be close to but slightly higher than an upper limit of solidification temperature range for said respective group of chemical components, so that, by starting with an adsorption step having a highest treatment temperature and carrying out the adsorption steps at one or more successively lower temperatures until the adsorption step having the lowest temperature is completed, the chemical components are adsorbed and removed group by group starting with a group having a highest solidification temperature range and ending with a group having a lowest solidification temperature range.

7. A method according to claim 6, wherein said adsorbent selectively and preferentially adsorbs nitrogen in a temperature range from −60° C. to −180° C.

8. A method according to claim 2, wherein said adsorbent selectively and preferentially adsorbs nitrogen in a temperature range from −60° C. to −180° C.

9. A method according to claim 2, further comprising the step, before said step of cooling, of removing carbon dioxide and moisture from the starting material air.

10. A method according to claim 1, wherein said chemical components are present in said super clean air in an amount not greater than 1 ppb, and said super clean air has a dew point of not higher than −100° C.

11. An apparatus for producing super clean air, comprising:

a nitrogen-producing apparatus; and a super clean air producing apparatus, including an adsorbent tower assembly, having an upstream input and a downstream output, to adsorb and remove chemical components other than nitrogen, oxygen and noble gases from input air and to output super clean air, wherein said nitrogen producing apparatus and said clean air producing apparatus are operatively linked so that nitrogen output from the nitrogen producing apparatus cools air input to said adsorption tower assembly.

12. An apparatus according to claim 11, further comprising, upstream from said adsorbent tower assembly, a room temperature adsorption tower having an adsorbent suitable for adsorbing moisture and carbon dioxide gas.

13. An apparatus according to claim 12, further comprising:
 a cooling device suitable to remove moisture from the air, disposed upstream of said room temperature adsorption tower;
 a catalyst tower, having a catalyst suitable to oxidize chemical components in the air, disposed upstream of the cooling device; and
 a compressor, disposed upstream of the catalyst tower.

14. An apparatus for producing super clean air, comprising:
 a nitrogen-producing apparatus; and
 a super clean air producing apparatus, including
  an adsorbent tower assembly, having an upstream input, a downstream output, a heat exchanger, and twin adsorption towers downstream of the heat exchanger to adsorb and remove chemical components other than nitrogen, oxygen and noble gases from input air and to output super clean air,
  wherein said nitrogen producing apparatus and said heat exchanger of the adsorbent tower assembly are operatively linked so that nitrogen output from the nitrogen producing apparatus cools air input to said twin adsorption towers, and so that said twin absorption towers are alternately regenerated using nitrogen from said nitrogen producing apparatus.

15. An apparatus according to claim 14, wherein said adsorbent tower assembly comprises a plurality of successive heat exchangers and twin adsorption towers downstream of each heat exchanger to adsorb and remove chemical components other than nitrogen, oxygen and noble gases from input air and to output super clean air,
 wherein said nitrogen producing apparatus and each of said heat exchangers of the adsorbent tower assembly are operatively linked so that nitrogen output from the nitrogen producing apparatus is operatively connected to successively cool air input to each said twin adsorption towers, and so that said twin absorption towers alternately adsorb said chemical components from the air, and are alternately regenerated using nitrogen from said nitrogen producing apparatus.

16. An apparatus according to claim 15, further comprising a cooling source heat exchanger operatively connected to said nitrogen producing apparatus to cool, super clean air output from the last of said twin adsorption towers, to produce cooled, super clean air, wherein the cooled, super clean air flows back to successively upstream heat exchangers in the adsorbent tower assembly in order to provide said operative connection with said nitrogen producing apparatus to successively cool air input to each said twin adsorption towers.

17. An apparatus according to claim 16, further comprising, upstream from said adsorbent tower assembly, a room temperature adsorption tower having an adsorbent suitable for adsorbing moisture and carbon dioxide gas.

18. An apparatus according to claim 17, further comprising:
 a cooling device suitable to remove moisture from the air, disposed upstream of said room temperature adsorption tower;
 a catalyst tower, having a catalyst suitable to oxidize chemical components in the air, disposed upstream of the cooling device; and
 a compressor, disposed upstream of the catalyst tower.

19. An apparatus according to claim 14, further comprising, upstream from said adsorbent tower assembly, a room temperature adsorption tower having an adsorbent suitable for adsorbing moisture and carbon dioxide gas.

20. An apparatus according to claim 19, further comprising:
 a cooling device suitable to remove moisture from the air, disposed upstream of said room temperature adsorption tower;
 a catalyst tower, having a catalyst suitable to oxidize chemical components in the air, disposed upstream of the cooling device; and
 a compressor, disposed upstream of the catalyst tower.

* * * * *